United States Patent [19]
Yokoyama

[11] Patent Number: 4,926,346
[45] Date of Patent: May 15, 1990

[54] ROAD IMAGE INPUT SYSTEM FOR VEHICLE CONTROL

[75] Inventor: Shouji Yokoyama, Tokyo, Japan

[73] Assignees: Aisin-Warner Kabushiki Kaisha; Kabushiki Kaisha Shinsangyokaihatsu, both of Tokyo, Japan

[21] Appl. No.: 947,242

[22] Filed: Dec. 29, 1986

[30] Foreign Application Priority Data

Dec. 27, 1985 [JP] Japan .................. 60-294755

[51] Int. Cl.$^5$ .............................. G06F 15/62
[52] U.S. Cl. .................. 364/518; 364/424.02
[58] Field of Search ........... 364/456, 457, 424, 460, 364/461, 462, 518, 521, 424.01, 424.02; 358/103

[56] References Cited

U.S. PATENT DOCUMENTS

| | | | |
|---|---|---|---|
| 4,219,847 | 8/1980 | Pinkney et al. | 358/126 |
| 4,278,142 | 7/1981 | Kono | 180/168 |
| 4,315,240 | 2/1982 | Spooner | 340/27 R |
| 4,482,960 | 11/1984 | Pryor | 364/424 |
| 4,521,777 | 6/1985 | Nakamura et al. | 340/995 |
| 4,566,032 | 1/1986 | Hirooka et al. | 358/103 |
| 4,628,453 | 12/1986 | Kamejima et al. | 364/424 |
| 4,670,845 | 6/1987 | Etoh | 364/461 |
| 4,679,808 | 7/1987 | Ito et al. | 280/91 |
| 4,679,809 | 7/1987 | Ito et al. | 280/91 |
| 4,700,223 | 10/1987 | Shoutaro et al. | 358/93 |
| 4,703,429 | 10/1987 | Sakata | 364/426 |
| 4,769,700 | 9/1988 | Pryor | 358/107 |
| 4,829,434 | 5/1989 | Karmel et al. | 364/424.1 |

OTHER PUBLICATIONS

Farina et al., "Track-While-Scan Algorithm in a Clutter Environment" IEEE Transactions on Aerospace and Electronic Systems, 9/78.

*Primary Examiner*—Gary V. Harkcom
*Assistant Examiner*—Phu K. Nguyen
*Attorney, Agent, or Firm*—Wegner & Bretschneider

[57] ABSTRACT

A road image input system for controlling an automotive vehicle includes a pick-up mounted on the vehicle for picking up the image of a road ahead of the traveling vehicle, a sensor for sensing the traveling condition of the vehicle, and an image processor for obtaining information indicative of the road by setting an image processing window on the image which has been picked up and processing data contained within the image processing window. The image processing window is set at a position based on values of the vehicle velocity and the steering angle of the steering wheel.

5 Claims, 8 Drawing Sheets

ROAD IMAGE INPUT SYSTEM FOR VEHICLE CONTROL

BACKGROUND OF THE INVENTION

This invention relates to a road image input system for controlling an automotive vehicle by picking up the scene of a road in the direction in which the vehicle is traveling, setting an image processing area on the image of the road scene picked up, and processing data contained in the image processing area.

In order to keep a four-wheel drive vehicle in an appropriate traveling state despite changes in the road surface on which the vehicle is running, a four-wheel drive control system has been proposed in which the vehicle is switched over to a control mode different from that of the simple four-wheel drive traveling mode whenever necessary.

Such a control system is of two different types. One is a part-time four-wheel drive system in which, in accordance with the road surface conditions, a changeover can be made whenever necessary between two-wheel drive in which either the front or rear wheels are driven and four-wheel drive in which both the front and rear wheels are driven.

The other type of control system is a full-time four-wheel drive system having a center differential mechanism for absorbing a difference in turning radius that develops between the front and rear wheels at cornering. In order to make it possible to switch the control mode in accordance with the road surface conditions, this system is provided with a locking mechanism for direct transfer between the front and rear wheels without the intervention of the center differential mechanism. The center differential mechanism is locked when a large driving force is necessary, as at acceleration or during travel on a poor road surface, and unlocked during ordinary travel when a large driving is not required.

In general, control for switching between two- and four-wheel drive in the part-time configuration or for locking the center differential mechanism in the full-time arrangement is a manual operation performed by the driver based on his or her judgment of the road surface conditions. Recently, however, a system has been proposed in which such control is executed automatically by sensing the traveling state of the vehicle and judging the road surface conditions accordingly. A vital factor for achieving safe and stable vehicle travel with such a system is how to sense the conditions of the road surface accurately.

In the arrangement where the changeover is made manually, the driver must constantly scrutinize the road conditions ahead of the vehicle and the manual changeover operation is a troublesome one. With the automatically controlled system, on the other hand, the state of the road surface on which the vehicle is currently traveling can be sensed but not the road surface conditions ahead of the vehicle. Consequently, there are cases where the changeover between two-wheel/four-wheel drive or the locking of the center differential mechanism occurs after the conditions of the road surface have changed. Accordingly, a suitable response to the road surface conditions may be delayed. This can have a detrimental effect upon the safety and stability of vehicle travel.

One expedient that immediately comes to mind for observing road surface conditions ahead of a traveling vehicle is a camera utilizing a well-known CCD. Generally, in the computerized processing of an image obtained from a camera, processing all of the image data available involves an extremely large quantity of data and therefore requires a considerable period of time. Accordingly, processing time can be shortened if the quantity of image data to be processed is reduced by limiting the subject matter to a processing area or "window" set on the image. In most cases, however, such computerized image processing is for processing solely a specific window on the image on the condition that the camera is not moved; once the window has been set at a specific position, no modification is necessary. This means that such a system cannot be directly applied to the control of a vehicle, for in such case the camera would move when the vehicle does. Let us describe this with reference to FIGS. 1A and 1B.

As shown in FIG. 1A, it is necessary that the window be set on a road surface portion of an image in order that the condition of the road surface ahead of the vehicle may be sensed on the basis of image data obtained from a camera mounted on the vehicle. However, since the road surface portion of interest moves to the left and right on the image plane due to curves in the road, there are instances where the window will not be located on the road surface, as shown in FIG. 1B. The condition of the road surface can no longer be sensed correctly at such time. Furthermore, since there is a response delay between detection of the road condition and control to deal with the condition, control is not always performed at the proper timing, namely at the moment the vehicle passes over the portion of the road surface sensed. Moreover, the condition of the road surface outside the window cannot be sensed merely by setting the window at a single position.

SUMMARY OF THE INVENTION

An object of the present invention is to obtain information relating to the conditions of a road surface lying ahead of a traveling vehicle.

Another object of the present invention is to pick up the scene of a road ahead of a traveling vehicle and set a window corresponding to the road surface ahead of the traveling vehicle on the image obtained.

Still another object of the present invention is to enable a correct image input of the conditions of a road surface ahead of a traveling vehicle at all times even when the road curves and vehicle velocity changes.

A further object of the present invention is to obtain road surface information in line with vehicle control timing.

According to the present invention, the foregoing objects are attained by providing a road image input system for controlling an automotive vehicle by picking up the scene of a road ahead of a traveling vehicle through use of a camera mounted on the vehicle, setting an image processing area on the image of the road scene which has been picked up, and processing data contained in the image processing area. The system is characterized in that after the image processing area is initially set on the image at a point on the road ahead of the traveling vehicle, an amount by which the image processing area should be moved is calculated by sensing vehicle velocity and steering angle, and the area is moved so as to be present on the road ahead of the vehicle at all times.

With such an arrangement, the present invention enables the image processing area or "window" to be moved from side to side in dependence upon the steering angle of the vehicle steering wheel as well as up and down in dependence upon vehicle velocity so that the condition of the road surface ahead of the traveling vehicle can be accurately judged.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described with reference to the drawings.

Figure 1A:
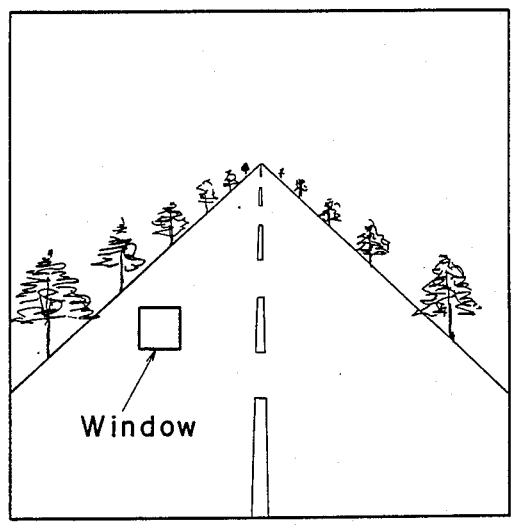
FIG. 1A is a view showing the relationship between a window position and a road when a vehicle is traveling in a straight line.
Figure 1B:
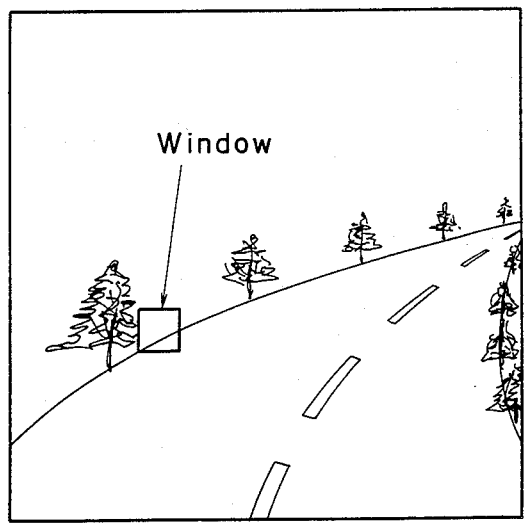
FIG. 1B is a view showing the relationship between a window position and a road when a vehicle is traveling along a curve.
Figure 2:
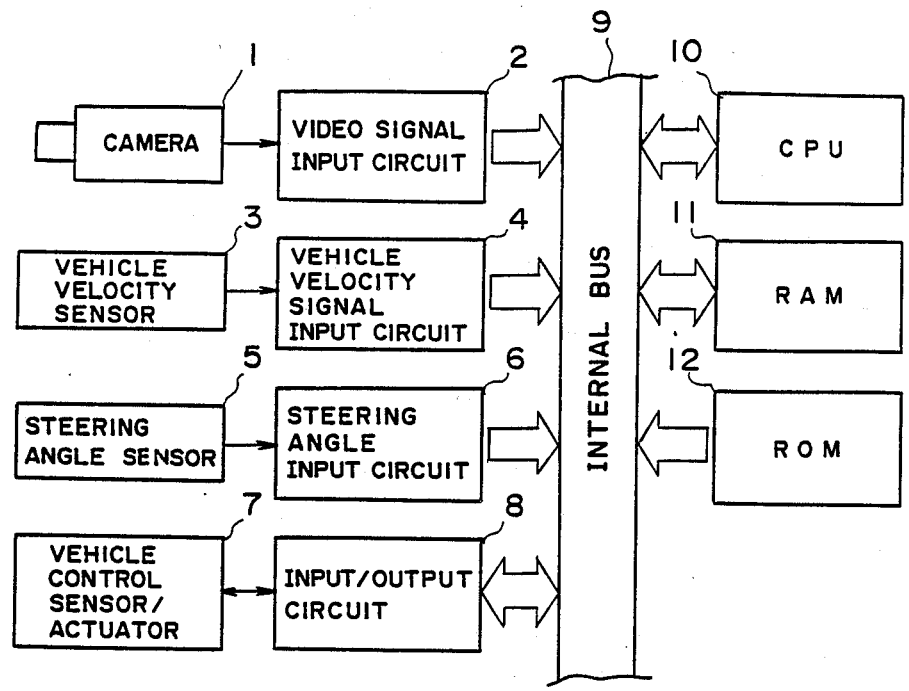
FIG. 2 is a block diagram illustrating an embodiment of a control system used for making inputs in accordance with the present invention.

A control system embodying the invention is illustrated in FIG. 1 and includes a camera 1 mounted on an automotive vehicle, a picture signal input circuit 2 receiving the output of the camera 1, a vehicle velocity sensor 3, a vehicle velocity signal input circuit 4 receiving the output of the velocity sensor 3, a steering angle sensor 5, a steering angle signal input circuit 6 receiving the output of the sensor 5, a sensor/actuator 7 for vehicle control, an input/output circuit 8, a internal bus 9 connected to the circuits 2, 4, 6 and 8, a central processor 10 connected to the bus 9, a memory (RAM) 11 connected to the bus 9, and a memory (ROM) 12 connected to the bus 9.

The camera 1 mounted on the vehicle is adapted to pick up the condition of the road surface ahead of the traveling vehicle and produce a video signal indicative thereof. The video signal is delivered to the picture signal input circuit 2. The vehicle velocity sensor 3 and steering angle sensor 5 produce output signals indicative of vehicle velocity and steering angle and deliver these signals to the input circuits 4, 6, respectively. The sensor/actuator 7 for vehicle control is equipped with sensors and actuators for performing a variety of vehicle control operations and is adapted to exchange signals with the input/output circuit 8. Output signals from the picture signal input circuit 2, vehicle velocity input circuit 4, steering angle input circuit 6 and input/output circuit 8 are delivered to the central processing unit 10 through the internal bus 9. Data stored in the RAM 11 and ROM 12 are also sent to the central processing unit 10 through the internal bus 9. The central processing unit 10 executes various processing based on the inputs thereto and delivers an output resulting from such processing to the input/output circuit 8 via the internal bus 9 to operate the actuators in the sensor/actuator 7.

Figure 3:
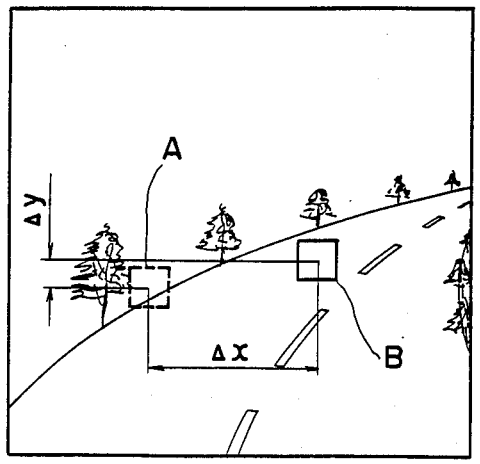
FIG. 3 is a view useful in describing the specifics of control performed in accordance with the above embodiment.

Let us describe the specifics of control performed by the central processing unit 10. As shown in FIG. 3, the position of a referential processing area (hereafter referred to as a "window") A is first set a fixed distance ahead of the traveling vehicle on the image of the road, after which signals indicative of velocity (v) and steering angle (a) are inputted. Based on the inputted values, the central processing unit 10 computes quantities $\Delta x = f(a)$, $\Delta y = f(v)$ by which the window is to be moved along X and Y axes on the image of the road. A window B is then set at a position displaced from the original position by $\Delta x$, $\Delta y$. The central processing unit 10 reads image data indicative of the road surface condition within this window from the picture signal input circuit 2 and processes these data. More specifically, the window is moved rightward by $\Delta x$ if the vehicle curves to the right and leftward if the vehicle curves to the left. At a higher vehicle velocity the window is moved upward (farther ahead of the vehicle) by $\Delta y$ (y being measured from the top of the visual frame to the window); at a lower vehicle velocity, the window in moved downward (closer to the front of the vehicle). Note that the central processing unit 10 can be adapted to perform the calculations $\Delta x = ka$, $\Delta y = kv$, where k is a constant.

Figure 4:
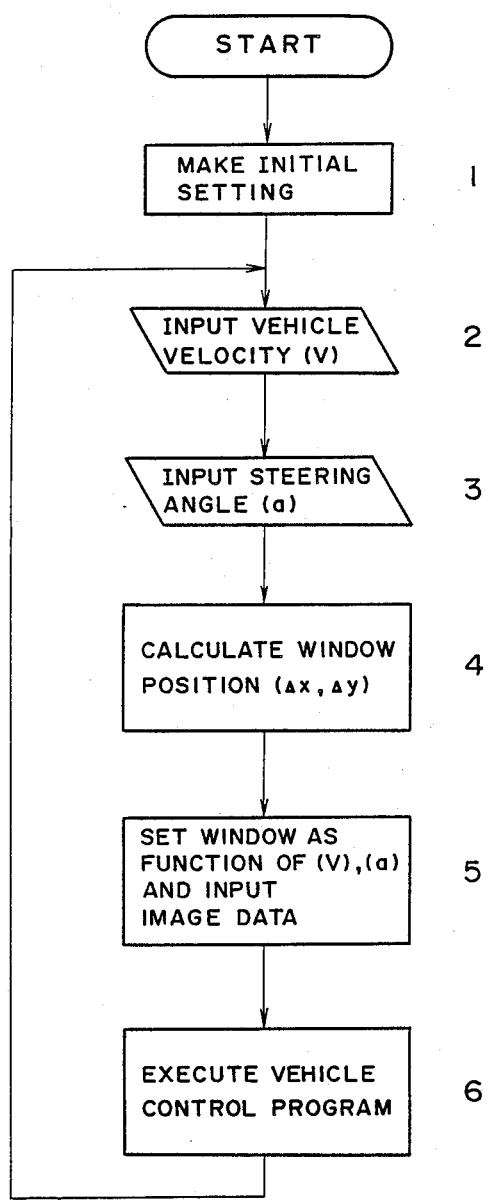
FIG. 4 is a flowchart for describing processing in accordance with the input system of the invention.

The flow of input processing according to the invention is illustrated in the flowchart of FIG. 4. Step (1) of the flowchart calls for the referential window position to be initially set. This is followed by steps (2) and (3), at which the vehicle velocity (v) and steering angle (a) are inputted from the vehicle velocity sensor 3 and steering angle sensor 5, respectively. The program then proceeds to a step (4), at which the central processing unit 10 calculates, based on the inputted values, the quantities $\Delta x$, $\Delta y$ by which the window is to be moved on the image of the road. Next, step (5) calls for the central processing unit 10 to set the window at a position obtained by movement corresponding to $\Delta x$ and $\Delta y$, and to input and process the image data within the window. Finally, step (6) calls for the central processing unit 10 to exercise control in accordance with a vehicle control program based on the results of this processing. Such control entails switching between two- and four-wheel drive or locking/unlocking the center differential mechanism in dependence upon the condition of the road surface.

Figure 5A:
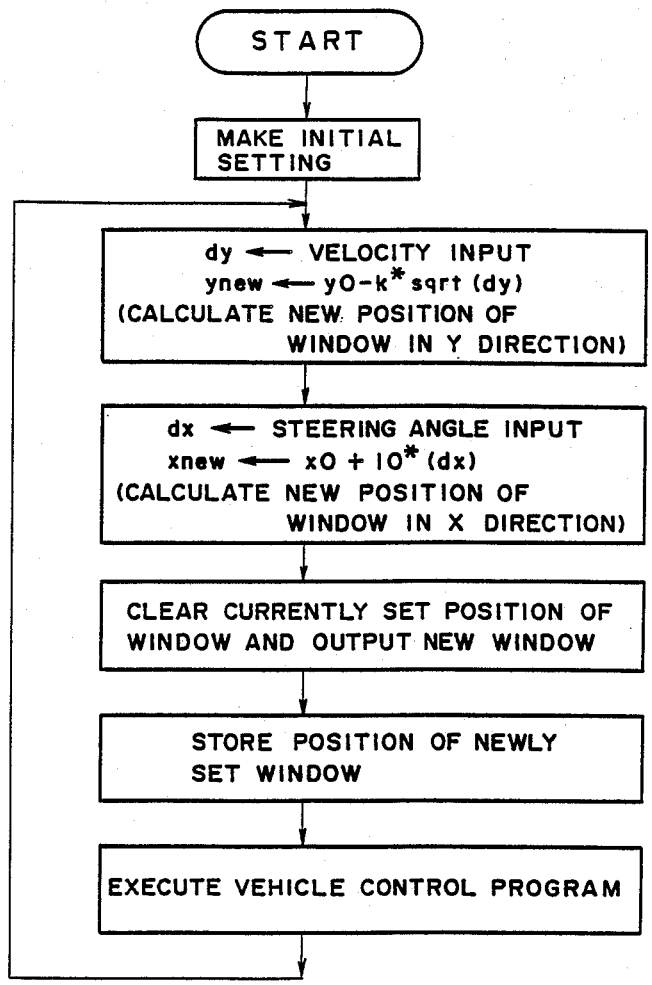
FIG. 5A is a flowchart showing the details of processing in accordance with the input system of the invention.

The above processing is shown in greater detail in the flowchart of FIG. 5A. In the flow chart as illustrated in FIG. 5, substantially the same processing as that of FIG. 4 is carried out. The position of an initial window, corresponding to the vehicle at rest, is set at {x0, y0}, and the vehicle speed is input (dy) to calculate the y-direction position (ynew) of a new window according to the formula: $Y_{new} = Y_o - k/dy$. Subsequently, the steering angle is input (dx), and the x-direction position (xnew) of the new window is calculated according to the formula: $x_{new} = x_o + 10(dx)$. Subsequently, the window currently being set is erased, the new window is output, and the position of the newly set window is stored. An example of the program for such processing is as follows:

```
                (INITIAL SETTING)
    dy=speed( ):
    ynew=yO−k*sqrt(dy):
    dx=stang( ):
    xnew=xO+10.0*dx;
    window(xold,yold,xnew,ynew):
    xold=xnew: yold=ynew:
            (VEHICLE CONTROL PROGRAM)
```

FIGS. 5B–5F provide detailed examples of each step of FIG. 5A. In the vehicle velocity input routine of FIG. 5B, the vehicle speed (dy) is determined and converted to digital using an A/D conversion loop. Similarly, in the steering angle input routine of FIG. 5C, the steering angle (dx) is determined and converted to digital using an A/D conversion loop.

Figure 5B:
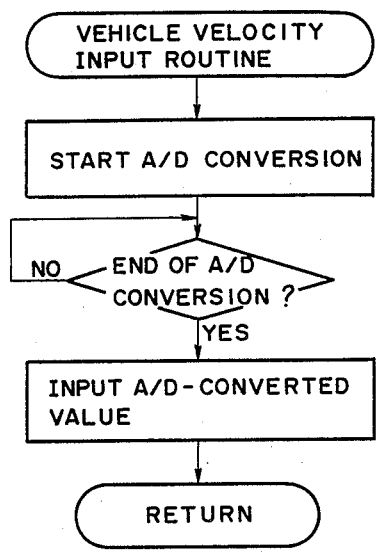
FIG. 5B is a flowchart showing a specific example of a vehicle velocity input routine.
Figure 5C:
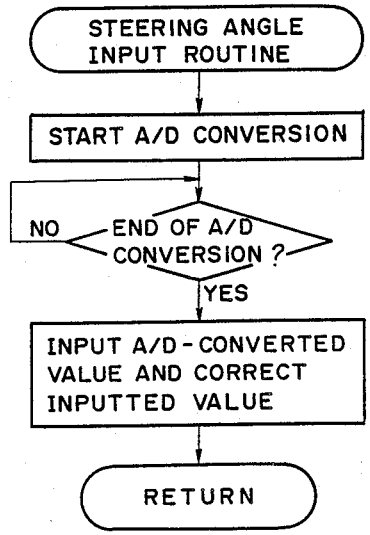
FIG. 5C is a flowchart showing a specific example of a steering angle input routine.
Figure 5D:
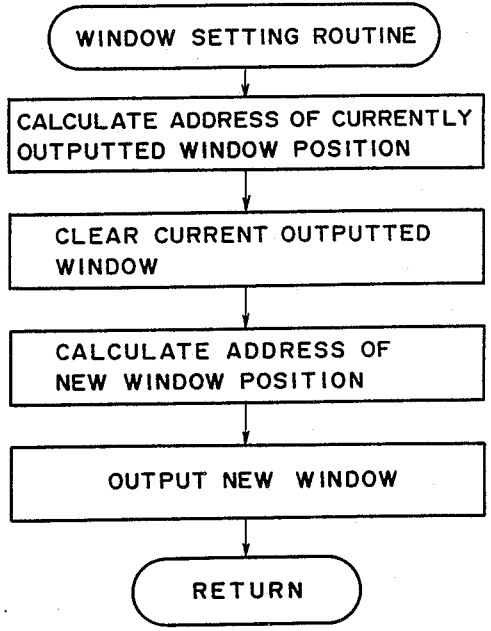
FIG. 5D is a flowchart showing a specific example of a window setting routine.

In FIG. 5D, the window setting routine is shown. This routine calculates the address of the window position currently being output (xold), erases this position, calculates the address of a window position (xnew) and outputs the new position.

Figure 5E:
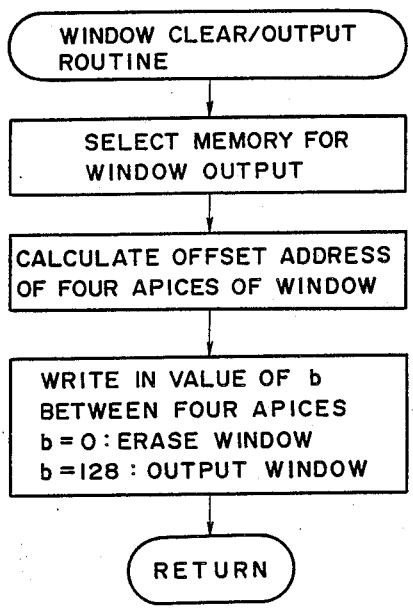
FIG. 5E is a flowchart showing a specific example of a window erase/output routine.
Figure 5F:
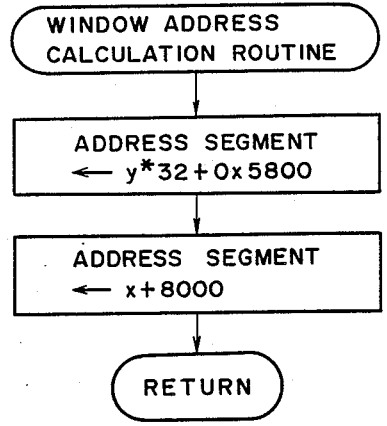
FIG. 5F is a flowchart showing a specific example of a window position address computing routine.

The window clear/output routine shown in FIG. 5E selects a memory for outputting a new window. The offset address of four apices of the window is then calculated and the value of b between the four apices is written in. FIG. 5F shows the window address calculation routine.

FIG. 5B is a flowchart of processing for a vehicle velocity input subroutine. An example of the program is as follows:

```
    /* speed input */
    speed( )
    {
    int pta=240,ptd,ad:
    /* A/O conv. start */
    ptd=0: outp(pta,ptd): /* channel 1 select
    ptd=8: outp(pta,ptd): /* sample holed */
    ptd=0: outp(pta+2,ptd): /* A/D start */
    /* A/D input */
    do
    ad=inp(pta);
    while(ad%2= 0);
    ad=inp(pta+2);
    return(ad):
    }
```

FIG. 5C is a flowchart of processing for a steering angle input subroutine. An example of the program is as follows:

```
    /* stearing angle input */
    stang( )
    {
    int ad pta=0x,fO,ptd=)xO1:
    /* A/O conv. start */
    outp(pta,ptd): /* channel 2 select */
    outp(pta,ptd+8): /* sample holed */
    outp(pta+2,ptd): /* A/O start */
    /* A/O input */
    do
    ad=inp(pta):
    while(ad%2= =0):
    ad=inp(pta+2): ad−−=210:
    return(ad):
    }
```

FIG. 5D is a flowchart of processing for a window setting subroutine. An example of the program is as follows:

```
    window(xold,yold,xnew,ynew)
    int xold,yold,xnew,ynew:
    {
    int b:
    unsigned seg.ofs:
    /* old window erase */
    segofs(xold,yold,&seg,&ofs):
    b=0:
    windout(seg.ofs,b):
    /* new window output */
    segofs(xnew,ynew,&seg,&ofs):
    b=128:
    windout(seg,ofs,b):
    }
```

FIG. 5E is a flowchart of processing for a window clear/output routine. An example of the program is as follows:

```
    window(seg,ofs,b)
    unsigned seg,ofs:
    int b:
    {
    unsigned wofs0,wofs1,wofs2,wofs3,
    int a=15,n=1,i,ptadrs,ptdata
    /* overlay memory selection */
    ptadrs=212: ptdata=1:
    outp(ptards,ptdata);
    /* window apex offset calc. */
    wofs0=ofs−513*a:
    wofs1=wofs0+2*a:
    wofs2=wofs1+1024*a:
    wofs3=wofs2−2*a:
    /* window output */
    for(i=0: i<=2*a−1: ++i)
    {
    poke(seg,wofs0,&b,n):
    poke(seg,wofs1,&b,n):
    poke(seg,wofs2,&b,n):
    poke(seg,wofs3,&b,n):
    wofs0++;
    wofs1+=512:
    wofs2−−:
    wofs3−=512:
    }
    }
```

FIG. 5F is a flowchart of processing for a window position address calculation routine. An example of the program is as follows:

```
    segofs(x,y,pseg,pofs)
    unsigned x,y,*pseg,*pofs:
    {
```

```
    *pseg=y*32+22528:
    *pofs=x+32768:
}
```

Figures 6A, 6B:
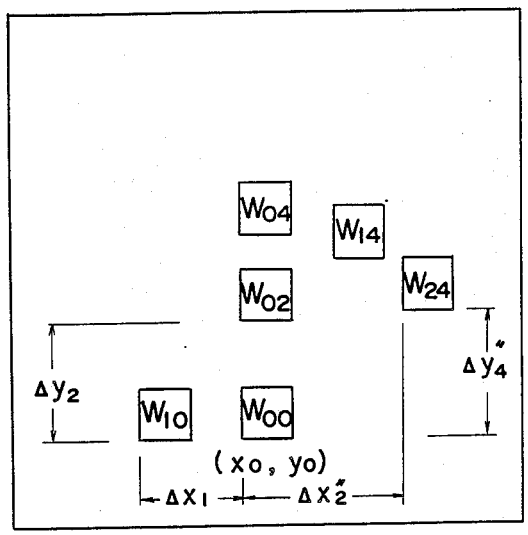
FIG. 6A is a view showing the relationship between a change in vehicle velocity and steering angle and window position.
FIG. 6B is a view showing a table in which window position is set as a function of a change in vehicle velocity and turning angle.

Let us now describe another example of processing for setting a window. Let $W_{0,0}$ ($x_0$, $y_0$) represent the position of a window set initially as a reference, as shown in FIG. 6A. If the vehicle velocity (v) is raised while the steering angle (a) is held at zero, only the value of the y coordinate of the window position will increase, as shown at $W_{0,2}$, $W_{0,4}$. In other words, the position of the window will simply be shifted farther ahead of the traveling vehicle. The higher the position of the window on the image, the greater the actual corresponding distance along the road per unit length on the image. Therefore, the value of the y coordinate is not increased in proportion to the vehicle velocity. Instead, the amount by which the window position is shifted in the y direction is gradually reduced toward the upper part of the image so that the amount of shift will correspond to the actual distance along the road. In other words, assume that the y coordinate of window $W_{0,0}$ is shifted to $W_{0,2}$ by an increase of $\Delta y_2$ for a certain unit increase in vehicle velocity. For the same unit increase in velocity starting from window $W_{0,2}$, the y coordinate will be shifted upward by an amount smaller than $\Delta y_2$. For example, the new window position in such case will be $W_{0,4}$. Thus, the shift from $W_{0,2}$ to $W_{0,4}$ is smaller than that from $W_{0,0}$ to $W_{0,2}$ even though the unit increase in velocity is the same.

Let us take steering angle into consideration as well. The x coordinate is shifted in dependence upon the magnitude of the steering angle. As in the case of velocity, the amount of y-coordinate shift is reduced further, as from $W_{0,4}$ to $W_{1,4}$ and thence to $W_{2,4}$. In other words, the position of the window should be set in dependence upon vehicle velocity and steering angle so as to obtain image information indicative of the road surface that will be traversed by the vehicle upon passage of a prescribed period of time. To this end, the window position can be set by performing a calculation using an arithmetic expression involving vehicle velocity and steering angle. However, a suitable alternate approach would be to prepare a table in which the amount of shift is set based on vehicle velocity and steering angle, as shown in FIG. 6B, store the table in the ROM and then look up the table when required.

Figure 7:
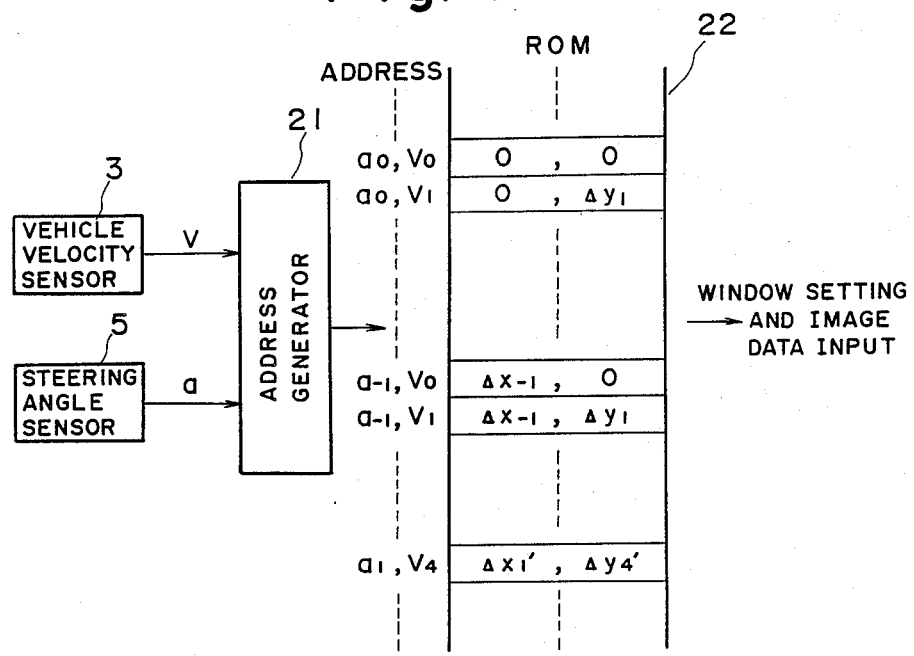
FIG. 7 is a view showing the configuration of a window position computing section.

FIG. 7 illustrates the configuration of a processing section for performing window position computations based on inputs of vehicle velocity (v) and steering angle (a) and utilizing the table shown in FIG. 6. In the arrangement of FIG. 7, it is assumed that data stored in a ROM 22 include shift quantities based on the table shown in FIG. 6B. When these data have been stored in the ROM 22, an address generator 21 reads in signals from the vehicle velocity sensor 3 and steering angle sensor 5 and, based thereon, generates an address of a location in the ROM 22 storing the shift quantity required. For example, if the inputs to the address generator 21 are indicative of a vehicle velocity $v_4$ and a steering angle $a_1$, then the address generator 21 will generate the address of the ROM location storing the shift quantities $\Delta x_1'$, $\Delta y_4'$, in accordance with FIG. 6B.

Figure 8:
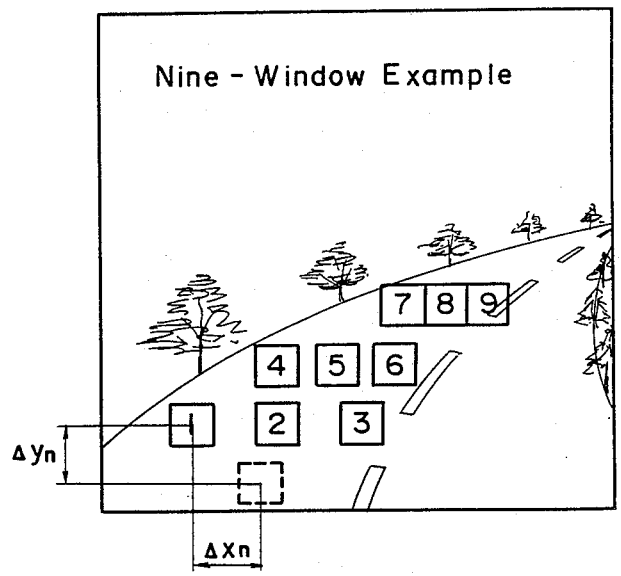
FIG. 8 is a view useful in describing the specifics of control in accordance with another embodiment of the invention.

FIG. 8 illustrates another embodiment of the present invention. The characterizing feature here is that a plurality (e.g. nine) of windows are set. The input system is similar to that for the single window arrangement shown in FIGS. 2 through 7. Each window is shifted by $\Delta x_n$, $\Delta y_n$ (n=1-9) in accordance with the values of vehicle velocity (v) and steering angle (a). In FIG. 8, the windows are set three at a time as the distance front the vehicle becomes more remote. However, the number of windows may be reduced farther ahead of the vehicle and increased closer to the vehicle. With such an arrangement, the most important data, namely the data indicative of the road condition just ahead of the vehicle, can be inputted with higher priority while placing a limitation on the number of windows.

In accordance with the present invention as described above, the window constituting the image processing area is moved to the left and right in dependence upon the steering angle as well as up and down in dependence upon the vehicle velocity. This makes it possible to accurately input the image of the road surface condition lying ahead of the traveling vehicle even if the road is curved and vehicle velocity changes. Thus, besides control for switching between two- and four-wheel drive and control for locking the center differential mechanism, control of a suspension operatively associated with the shifting of an automatic transmission can be made to conform to road surface conditions immediately and in appropriate fashion. This assures that the vehicle will travel safely and stably.

As many apparently widely different embodiments of the present invention can be made without departing from the spirit and scope thereof, it is to be understood that the invention is not limited to the specific embodiments thereof except as defined in the appended claims.

What I claim is:

1. A road image input system for controlling an automotive vehicle, comprising:
   pick-up means mounted on the vehicle for picking up an image of a road ahead of the vehicle;
   sensing means for sensing the traveling condition of the vehicle; and
   image processing means for obtaining information indicative of the road by adjusting the position of an image processing window in the x- and y-directions according to the output of said sensing means on a part of the image which has been picked up and processing data contained within said image processing window.

2. The system according to claim 1, wherein said sensing means comprises:
   means for sensing vehicle velocity, and
   means for sensing steering angle.

3. The system according to claim 1, wherein said image processing means comprises:
   means for setting a reference image processing window, and
   arithmetic means for computing an amount of movement of the image processing window based on values of vehicle velocity and steering angle.

4. The system according to claim 3, wherein said arithmetic means moves the image processing window farther ahead of the vehicle or closer to the vehicle along the road based on a change in vehicle velocity, and leftward and rightward across the road based on a change in steering angle.

5. The system according to claim 1, wherein said image processing means comprises:
   means for setting a plurality of reference image processing windows, and
   arithmetic means for computing an amount of movement of each of the plurality of image processing windows based on values of vehicle velocity and steering angle.

* * * * *